(12) United States Patent
Restrick, Jr. et al.

(10) Patent No.: US 7,729,482 B2
(45) Date of Patent: Jun. 1, 2010

(54) METHOD AND SYSTEM FOR PROVIDING COMMUNICATION PROTOCOL INTEROPERABILITY

(75) Inventors: John K. Restrick, Jr., Palo Alto, CA (US); Tripti (nmi) Agarwal, Fremont, CA (US); Rongxuan V. Chen, San Jose, CA (US); Ho (nmi) Bao, Richardson, TX (US); David Wayne Mills, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 11/364,385

(22) Filed: Feb. 27, 2006

(65) Prior Publication Data

US 2007/0201449 A1 Aug. 30, 2007

(51) Int. Cl.
*H04M 11/00* (2006.01)
(52) U.S. Cl. .............. 379/93.31; 379/93.28; 379/93.29; 370/356; 370/466
(58) Field of Classification Search ............. 379/90.01, 379/93.31, 142.01, 142.07, 266.01, 266.03, 379/93.28, 93.29, 93.311, 42.01; 370/466, 370/467
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,572,582 A * | 11/1996 | Riddle | 379/202.01 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,563,816 B1 | 5/2003 | Nodoushani et al. | 370/352 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |

(Continued)

OTHER PUBLICATIONS

H. Schulzrinne and C.Agboh, "Session Initiation Protocol (SIP)-H. 323 Interworking Requirements," RFC 4123, 15 pages, Jul. 2005.

(Continued)

*Primary Examiner*—Curtis Kuntz
*Assistant Examiner*—Yosef K Laekemariam
(74) *Attorney, Agent, or Firm*—Baker Botts L.L.P.

(57) ABSTRACT

A method for providing communication protocol interoperability may include receiving a request from a first endpoint to establish a communication session with a second endpoint, the request uses a first communication protocol. The method also includes receiving a first response from the second endpoint, the first response uses a second communication protocol different than the first communication protocol. The method may also include initiating a timer for receiving a set of capabilities from the second endpoint and establishing the communication session between the first endpoint and the second endpoint.

20 Claims, 2 Drawing Sheets

U.S. PATENT DOCUMENTS

| | | | |
|---|---|---|---|
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 6,820,133 B1* | 11/2004 | Grove et al. | 709/238 |
| 6,847,638 B1 | 1/2005 | Wu et al. | 370/389 |
| 6,888,803 B1* | 5/2005 | Gentry et al. | 370/259 |
| 2004/0247105 A1 | 12/2004 | Mullis et al. | 379/211.02 |
| 2005/0147088 A1 | 7/2005 | Bao et al. | 370/352 |
| 2005/0198261 A1* | 9/2005 | Durvasula et al. | 709/224 |
| 2006/0007954 A1 | 1/2006 | Agrawal et al. | 370/466 |
| 2007/0297339 A1* | 12/2007 | Taylor et al. | 370/248 |

OTHER PUBLICATIONS

J. Rosenberg and H. Schulzrinne, "An Offer/Answer Model with the Session Description Protocol (SDP)," RFC 3264, 24 pages, Jun. 2002.

J. Rosenberg, H. Schulzrinne, and P.Kyzivat, Caller Preferences for the "Session Initiation Protocol (SIP)," RFC 3841, 25 pages, Aug. 2004.

H. Schulzrinne and S. Petrack, "RTP Payload of DTMF Digits, Telephony Tones and Telephony Signals," RFC 2833, 27 pages, May 2000.

A. B. Roach, "Session Initiation Protocol (SIP)-Specific Event Notification", RFC 3265, 34 pages, Jun. 2005.

PCT Notification of Transmittal of the International Search Report and the Written Opinion of the International Searching Authority, or the Declaration mailed Nov. 6, 2007, re PCT/US07/01399 filed Jan. 19, 2007, Nov. 6, 2007.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

R. Mahy et al., "Remote Call Control in SIP using the REFER method and the session- oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

\* cited by examiner

METHOD AND SYSTEM FOR PROVIDING COMMUNICATION PROTOCOL INTEROPERABILITY

TECHNICAL FIELD OF THE INVENTION

This invention relates generally to communications systems and, more particularly, to a method and system for providing communication protocol interoperability.

BACKGROUND

Historically, telecommunications have involved the transmission of voice and fax signals over a network dedicated to telecommunications, such as the Public Switch Exchange (PBX). Similarly, data communications between computers have been historically transmitted on a dedicated data network, such as a Local Area Network (LAN) or a Wide Area Network (WAN). Currently telecommunications and data transmissions are being merged into an integrated communication network using technology such as Voice over Internet Protocol (VoIP). As new technologies emerge that take advantage of the capabilities of this integrated communication network so do the protocols that enable these technologies.

Two such protocols used in facilitating communications between endpoints are the session initiation protocol (SIP) and the H.323 protocol. However, these protocols were developed independently of each other and the way they negotiate media differs in ways that can make interoperability difficult. For example, it may be the case that one feature of one protocol does not have a corresponding feature in the other protocol. Furthermore, differences in the timing and content of information flow in each protocol are such that there does not exist a simple common scheme to map the information flows to each other. For example, when building a SIP to H.323 protocol gateway one particular problem for the gateway is interoperating a SIP delayed offer INVITE to an H.323 non-fast-start flow. This presents a problem because both endpoints are waiting for the other endpoint to transmit its capabilities, causing a deadlock in which neither endpoint does anything.

SUMMARY

In accordance with the present invention, a method and system for providing communication protocol interoperability is provided, which substantially eliminates or reduces the disadvantages and problems associated with previous systems and methods.

In accordance with a particular embodiment of the present invention, a method for providing communication protocol interoperability includes receiving a request from a first endpoint to establish a communication session with a second endpoint, the request uses a first communication protocol. The method also includes receiving a first response from the second endpoint, the first response uses a second communication protocol different than the first communication protocol. The method also includes initiating a timer for receiving a set of capabilities from the second endpoint, and establishing the communication session between the first endpoint and the second endpoint.

In more particular embodiments, the method may also include stopping the timer upon receiving a second response from the second endpoint, where the second response includes a first set of capabilities of the second endpoint. The method may also include sending a third response to the first endpoint, the third response including temporary setup information for the first endpoint that prevents the first endpoint from sending a communication until the communication session between the first endpoint and the second endpoint is established. The method may also include receiving a fourth response from the first endpoint comprising a second set of capabilities of the first endpoint, where the communication session between the first endpoint and the second endpoint is established using at least one capability that is common to both the first set of capabilities associated with the second endpoint and the second set of capabilities associated with the first endpoint.

The method may include stopping the timer after a first amount of time, during which time no response is received from the second endpoint. Where the method includes establishing the communication session between the first endpoint and the second endpoint, the method may include establishing a first communication session between the first endpoint and an intermediate endpoint based on a first capability common to the first endpoint and, the intermediate endpoint and establishing a second communication session between the second endpoint and the intermediate endpoint based on a second capability common to the first endpoint and the intermediate endpoint. The method may also include coupling the first communication session with the second communication session via a transcoder.

The method may include sending a fifth response to the first endpoint. The fifth response may comprise a third set of pre-configured capabilities and temporary setup information for the first endpoint that prevents the first endpoint from sending a communication until the communication session between the first endpoint and the second endpoint is established. The method may also include receiving a sixth response from the first endpoint comprising a second set of capabilities of the first endpoint, where the communication session between the first endpoint and the second endpoint is established using at least one capability that is common to both the second set of capabilities associated with the first endpoint and the third set of pre-configured capabilities.

In accordance with another embodiment of the present invention, a system for providing communication protocol interoperability includes an interface operable to receive a request from a first endpoint to establish a communication session with a second endpoint, the request uses a first communication protocol. The interface may also receive a first response from the second endpoint, the first response uses a second communication protocol different than the first communication protocol. The system also includes a processor coupled to the interface and operable to initiate a timer for receiving a set of capabilities from the second endpoint. The processor is also operable to establish the communication session between the first endpoint and the second endpoint.

Technical advantages of particular embodiments of the present invention include establishing communication sessions between endpoints that may use different communication protocols, such as SIP or H.323. Accordingly, a user of an endpoint using one type of communication protocol is provided with more flexibility: allowing him to communicate with a greater number of end users. Another technical advantage of particular embodiments of the present invention relates to its ability to avoid assumptions as to the capabilities supported by either endpoint. Hence, the capabilities and features of the endpoints are better accounted for by the present invention. Another technical advantage of particular embodiments of the present invention is that the timer may be used to prevent a deadlock when one of the endpoints does not communicate its capabilities. Accordingly, fewer hang-ups may occur when communication sessions are initiated.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
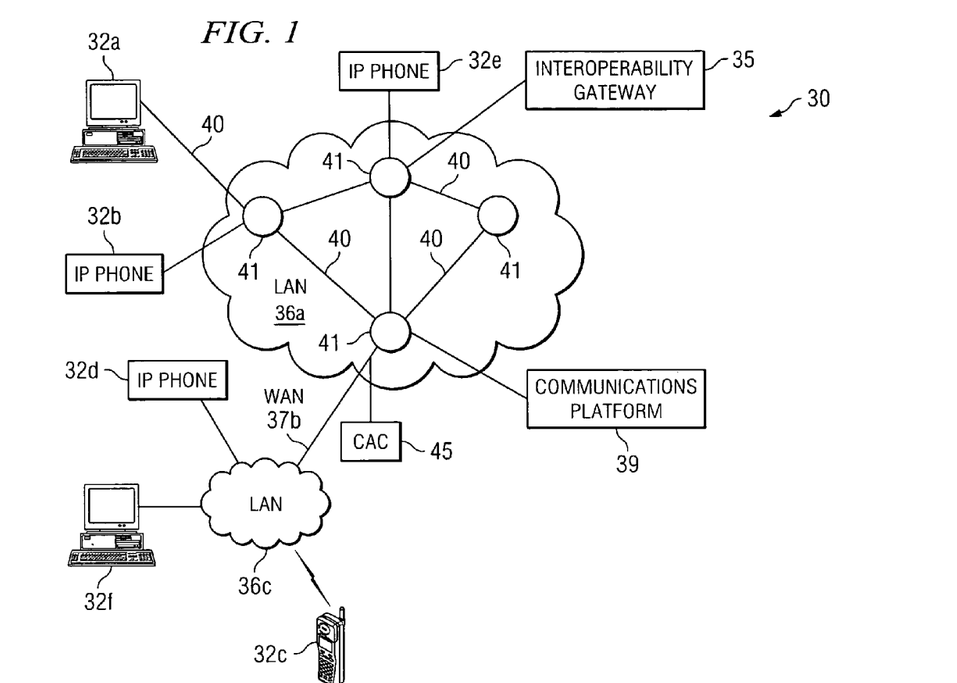
FIG. 1 is a simplified block diagram that illustrates a communication system for providing a communication protocol interoperability feature in accordance with a particular embodiment of the present invention.

FIG. 1 illustrates a communication system 30 including a plurality of endpoints 32a-32f having the ability to establish communication sessions between each other using one or more of communication networks 36a or 36c. Endpoints 32a-32f, interoperability gateway (IG) 35 and communications platform 39 may have the ability to communicate control protocol signals between each other. The control protocols used may be any protocol used in establishing communication sessions between two or more endpoints, such as session initiation protocol (SIP) or H.323. The control protocols may be used to facilitate establishing communication sessions using different forms of communication such as voice over internet protocol (VoIP), video over IP or any other form of communication that uses packets to transmit communications from one endpoint to another. A communication session shall include the sending or receiving of any type of media transmitted using any audio, video and/or data means through any suitable technology such as voice devices or instant messaging.

In particular embodiments, a request may be received at IG 35 or communications platform 39 from one endpoint to connect to another endpoint for a communication session in which the two endpoints may use different communication protocols to establish the communication session. In certain instances, the endpoint initiating the communication session will not initially provide its capabilities. When this happens, it may wait for the other endpoint to provide its capabilities before doing anything else. If the other endpoint provides its capabilities within a predetermined amount of time, communications platform 39 may relay those capabilities to the initiating endpoint, in which case the initiating endpoint may provide its capabilities. Communications platform 39 may then set-up a communication session between the two endpoints based on the capabilities provided by the initiating endpoint and the other endpoint.

If, on the other hand, the other endpoint does not provide its capabilities within the predetermined amount of time, communications platform 39 may create two communication sessions and, in essence, function as a bridge between the two communication sessions. Each communication session may include a connection between communications platform 39 and one of the endpoints where the connection is independent of the other connection between communications platform 39 and the other endpoint. These independent connections may be formed as though communications platform 39 were itself an endpoint attempting to communicate with each endpoint. In some embodiments, communications platform 39 (in forming these independent connections) may use a transcoder so that each endpoint may base its communication session on its own capability (e.g. one endpoint may use G.711 and the other endpoint may use G.729).

In some embodiments, if communications platform 39 does not receive the capabilities of the other endpoint within the predetermined amount of time it may assume/guess that the other endpoint has certain capabilities. These capabilities may be pre-configured with communications platform 39 so that they may be the same for every call. Communications platform 39 may then use the pre-configured capabilities in establishing the communication session between the two endpoints.

In the illustrated embodiment, communication network 36a is a local area network (LAN) that enables communication sessions between a plurality of endpoints 32a-32f and communications between endpoints 32, communications platform 39, and IG 35. The LAN can be distributed across multiple cities and geographic regions. Communication network 36c is another LAN, which couples endpoints 32c, 32d, and 32f with communication network 36a. Accordingly, users of endpoints 32a-32f, can establish calls, media sessions, or communication sessions between and among each network component coupled for communication with network 36a and/or 36c. In the illustrated embodiment, communication link 37b is a wide area network (WAN), which couples LANs 36a and 36c. A call admission control (CAC) system 45 may be used to monitor and police the bandwidth available over WAN 37b.

IG 35, in particular embodiments, may be functionally located between endpoints such that it may facilitate the establishment of communication sessions between endpoints, in particular it may facilitate establishing communication sessions between endpoints using different protocols for establishing communication sessions. IG 35 may be a standalone device or it may be incorporated within any of a variety of different components within a communication network, such as communications platform 39 or a session border controller. Regardless of where IG 35 is physically located, it may still be capable of facilitating the connection of endpoints for communication sessions.

In the illustrated embodiment, communication system 30 includes communications platform 39 that facilitates communication among users and maintains information on users of system 30. For example, communications platform 39 may facilitate connecting endpoint 32a which may be using SIP with endpoint 32f which may be using H.323. In some embodiments, communications platform 39 may monitor endpoints of the communication system and transmit information regarding the status of various endpoints and/or calls. Communications platform 39 may also provide other functionalities typically provided by communications platforms in communication systems.

Thus, the endpoints are SIP-compatible elements that include hardware and/or software that is operable to receive and to transmit data (directly or indirectly) and to implement the interoperability feature as outlined herein. Note that the term "endpoint" encompasses a myriad of potential devices and infrastructure that may benefit from the operations of communication system 30. An endpoint may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 30. The present invention is replete with numerous alternatives that could be used to facilitate the operations of communication system 30.

It should also be noted that the internal structure of the endpoints are malleable and can be readily changed, modified, rearranged, or reconfigured in order to achieve their intended operations as they pertain to the interoperability function. Note also that the endpoints can each include a link to communications platform 39, which is operable to communicate with any number of endpoints/user agents/devices. In one embodiment, communications platform 39 is a CallManager element, which is manufactured by Cisco Systems, Inc. of San Jose, Calif. The CallManager element is SIP-enabled, and it can readily accommodate other protocols (e.g., H.323). In other embodiments, communications platform 39 is any suitable component (e.g. a gateway, a switch, a router, a bridge, a state machine, a processor, etc.) that is operable to interface with endpoints/end-user.

Software and/or hardware may reside in communications platform 39 in order to achieve the teachings of the interoperability feature of the present invention, as outlined herein. However, due to its flexibility, communication platform 39 may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of communications platform 39 in the context of communication system 30 and, accordingly, it should be construed as such.

Communication network 36a includes a plurality of segments 40 and nodes 41 that couple endpoints 32a, 32b, and 32e with IG 35, communications platform 39 and communication networks 36b-36c. Therefore, a user of endpoint 32a is provided with access to endpoints 32b-32f. Furthermore, endpoints 32a-32f, IG 35, and communications platform 39 may all communicate control and data signals among each other. Nodes 41 may include any combination of network components, gatekeepers, communications platforms, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging, and e-mail. Any one of networks 36a-36c may be implemented as a local area network (LAN), wide area network (WAN), global distributed network such as the Internet, Intranet, Extranet, or any other form of wireless, or wireline communication network. In addition, communication networks in accordance with various embodiments may include any number of communications platforms 39 or IGs 35. Generally, network 36a provides for the communication of packets, cells, frames, or other portions of information (generally referred to as packets herein) between endpoints 32a-32f as part of the call as well as any control signals that may be needed. Communication network 36a may include any number and combination of segments 40, nodes 41, endpoints 32a-32f, IGs 35, and/or communications platforms 39.

In a particular embodiment, communication network 36a employs voice communication protocols that allow for the addressing or identification of endpoints, nodes, and/or communications platforms coupled to communication network 36a. For example, using internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateways. For example communication network 36a may be coupled with a PSTN network through a gateway. A PSTN network includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoints 32a-32f, IG 35, and communications platform 39 may include IP telephony capabilities allowing them to participate in and/or monitor IM, audio, video, and other multimedia communication sessions. Endpoints 32a-32f may use different protocols, such as SIP or H.323, in setting up multimedia communication sessions. IP telephony devices may include telephones, fax machines, computers running telephony software, nodes, gateways, wired or wireless devices, hand held PDAs, or any other device capable of performing telephony functions over an IP network.

Communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. Communication system 30 may also receive and transmit data in a H.323 environment. H.323 is a protocol used to provide for communication sessions on a packet network and works without dependency on the type of communication session that is being established. There may be significant overlap between the two protocols, however each protocol includes some features that are not directly mirrored in the other, causing conflicts when attempting to establish a communication session between endpoints using the two different protocols.

It will be recognized by those of ordinary skill in the art that endpoints 32a-32f, IG 35, and/or communications platform 39 may be any combination of hardware, software, and/or encoded logic that provides communication services to a user. For example, endpoints 32a-32f may include a telephone, a computer running telephony software, a video monitor, a camera, an IP phone, a cell phone or any other communication hardware, software and/or encoded logic that supports the communication of packets of media (or frames) using communication network 36a. Endpoints 32a-32f may also include unattended or automated systems, gateways, other intermediate components, or other devices that can establish calls. Although FIG. 1 illustrates a particular number and configuration of endpoints, segments, nodes, and gateways, communication system 30 contemplates any number or arrangement of such components for communicating media. In addition, elements of communication system 30, such as communications platform 39, may include components centrally located (local) with respect to one another or distributed throughout communication system 30.

Figure 2:
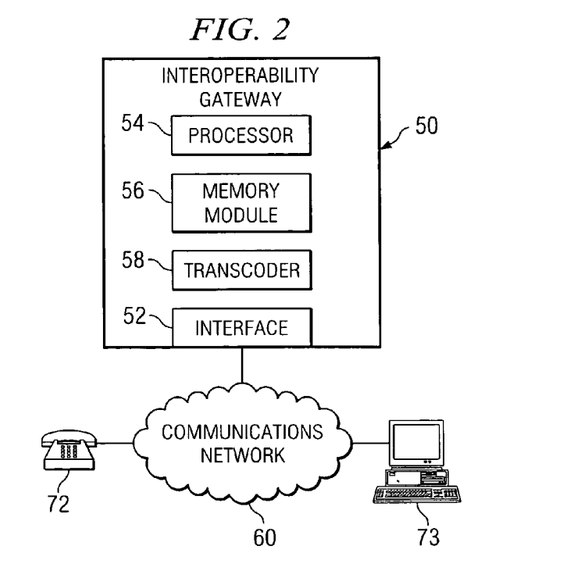
FIG. 2 is a simplified block diagram that illustrates an interoperability gateway of the present invention.

FIG. 2 illustrates an interoperability gateway (IG) 50, which may be similar to IG 35 of FIG. 1. Although FIG. 2 depicts IG 50 as being a standalone device, it may be incorporated within another device such as a session border controller or a communications platform. The functionality described herein with respect to IG 50 applies to other devices or components that may incorporate IG 50 or provide a similar interoperability service. In the illustrated embodiment, IG 50 includes an interface 52, a processor 54, a memory module 56, and a transcoder 58.

Interface 52 couples IG 50 with communication network 60 and is operable to receive communications from, and transmit communications to, a communication network 60. Processor 54 may be a microprocessor, controller, or any other suitable computing device, resource, or combination of hardware, software and/or encoded logic. Processor 54 may perform communication protocol interoperability functionality described herein with respect to particular embodiments. Memory module 56 may be any form of volatile or non-volatile memory including, without limitation, magnetic media, optical media, random access memory (RAM), read-only memory (ROM), removable media, or any other suitable local or remote memory component. Memory module 56 may store any suitable information to implement features of various embodiments, such as a listing of capabilities of a SIP or H.323 endpoint (note that a SIP endpoint or an H.323 endpoint generally refers to an endpoint that uses SIP or H.323, respectively, in establishing communication sessions).

Transcoder 58 includes functionality that allows it to communicate with a set of endpoints, for example IP phone 72 and PC 73, using any codec, feature or capability supported by the endpoint. It is the intent that transcoder 58 may use any codec, feature or capability that may be used by an endpoint. Transcoder 58 may comprise any combination of hardware, software, and/or encoded logic.

In the illustrated embodiment, IG 50 is coupled to endpoints 72 and 73 through communication network 60. Communication network 60 may include one or more communication networks and other suitable components, as described above with respect to communication system 30 of FIG. 1.

Endpoints 72 and 73 may use different communication protocols to set up communication sessions. In the illustrated embodiment, endpoint 72 is an IP phone that uses SIP to establish communication sessions and endpoint 73 is a PC that uses H.323 to establish communication sessions. Other embodiments may include more endpoints, use different types of endpoints, and/or include endpoints using different communication protocols.

As indicated above, depending on the situation, particular embodiments provide different ways of allowing endpoints using different communication protocols to establish communication sessions. The following examples are crafted to more clearly illustrate some of the functionality of the present invention.

In both the examples, endpoint 72 sends a request to establish a communication session with endpoint 73. Endpoint 72 is a SIP endpoint and, thus, its request may be in the form of an "invite." The invite may be with or without an "offer." Generally speaking, the offer contains information pertaining to the capabilities of the endpoint. An invite that does not include a session description protocol (SDP) may be called an invite without offer (may also be called delayed invite). SDP is an internet engineering task force (IETF) protocol that defines a text-based message format for describing a multi-media session. Data, such as version number, contact information, broadcast times and audio and video encoding types, are included in the message. For purposes of this example endpoint 72's request was an invite without offer, thus endpoint 72 has not yet sent its capabilities.

After sending an invite without offer, endpoint 72 may wait for a response before it does anything else. Meanwhile, IG 50 and endpoint 73 transmit signaling information between each other (e.g. H.225 and H.245) to establish a channel. Once IG 50 has established a channel with endpoint 73 (via the signaling information) IG 50 may [for example through processor 54] initiate a timer as it waits for endpoint 73 to communicate its capabilities. In H.323 this is done through a message containing the terminal capability set (TCS) of the endpoint. In some instances it may be that both endpoints are waiting for the other endpoint to send its capabilities before proceeding to send any more communications of its own. This creates a deadlock and, further, IG 50 may not presently be able to do anything about it because it does not know the capabilities of either endpoint. The timer, therefore, is used to give the endpoints a predetermined amount of time to send their capabilities before IG 50 takes action. IG 50 may connect the calls to itself or it may make an assumption as to the capabilities; these options will be discussed in more detail below.

In the first example, IG 50 receives endpoint 73's TCS before the timer runs out. When IG 50 receives the TCS, it stops the timer. In this example, IG 50 sends a response to endpoint 72 that may include the capabilities of endpoint 73. The response may also include a message that tells endpoint 72 not to send any communications and provides endpoint 72 with a temporary port and IP address (these will be changed later as explained below). For example, IG 50 may send a 200OK with a send only offer. IG 50 may also send an inactive offer. This prevents endpoint 72 from trying to communicate before it is actually connected with endpoint 73. It also triggers endpoint 72 to send an acknowledgement that may contain its capabilities. It should be noted that the response sent to endpoint 72 may not include information that will be used during the actual communication session (e.g. the port and IP address may change for the actual communication session).

Using the information from endpoint 72's acknowledgement and endpoint 73's TCS, IG 50 is able to establish a communication session between endpoints 72 and 73. It should be noted that in establishing the communication session between endpoints 72 and 73, IG 50 may reinvite endpoint 72. The reinvite may include IG 50 sending an "invite with sendreceive offer." This tells endpoint 72 what capabilities endpoint 73 has, and (unlike before) allows endpoint 72 to send and receive communications, as opposed to only receiving communications. The reinvite may also provide endpoint 72 with the actual port and IP address that will be used for the communication session.

In the second example, endpoint 73 does not send its capabilities before the timer runs out. In some embodiments, IG 50 may operate similar to the way it operated when it did receive endpoint 73's capabilities, only instead of passing on endpoint 73's capabilities to endpoint 72, IG 50 sends its own pre-configured capabilities. By having IG 50 supply the capabilities to be used, it avoids the potential deadlock as both endpoints wait for the other endpoint to send their capabilities.

The capabilities IG 50 sends may, in some instances, be preconfigured with IG 50 by a network administrator as he sets up a communications platform that includes IG 50. The capabilities may be stored in memory module 56, hardwired into IG 50, or otherwise integrated into IG 50. One situation where it may be useful to have IG 50 preconfigured with capabilities is where the capabilities of endpoints connected to IG 50 are already known. For example if IG 50 was integrated into a communications platform for a particular company, and endpoint 73 was a phone within the company's office, the network administrator may know that the company only uses phones having certain capabilities. Accordingly, when he installed the communications platform he may have programmed it with the capabilities of the phones used by the company. It may also be useful where the capabilities that IG 50 is configured with are common capabilities that a large percentage of endpoints support, such as G.711 for example.

In the depicted embodiment, IG 50 may use transcoder 58 in establishing and connecting two independent communication sessions. In this embodiment, when the timer runs out IG 50 may use one of the capabilities (enabled via transcoder 58) in establishing a communication session with endpoint 72. To do this IG 50 may communicate with endpoint 72 as though IG 50 was a SIP endpoint like endpoint 72. Accordingly, IG 50 may send an invite with sendreceive offer. At or approximately at the same time, IG 50 may communicate with endpoint 73 as though IG 50 was an H.323 endpoint. Accordingly, IG 50 may send its TCS to endpoint 73. Both endpoints may then be connected to IG 50 using a capability common between each respective endpoint and IG 50. The capabilities used by endpoints 72 and 73 may be different but that will not prevent the two endpoints from communicating because transcoder 58, in effect, works as a translator between the two endpoints.

It will be recognized by those of ordinary skill in the art that IG 50 is merely one example configuration of an IG for providing interoperability between endpoints using different communication protocols, in accordance with an embodiment of the present invention. Other IGs may include any number of interfaces, processors, memory modules, transcoders, and/or other components to accomplish the functionality and features described herein. For example, although IG 50 is illustrated and described as including interface 52, processor 54, memory module 56, and transcoder 58 these components and other desired components for performing the above described functionality may be centrally located (local) with respect to one another, or distributed throughout communication network 60. Furthermore, as mentioned above IG 50, or its equivalent functionality, may be a stand alone device or it may be integrated within a larger component or system, such as a session border controller or a communications platform.

Figure 3:
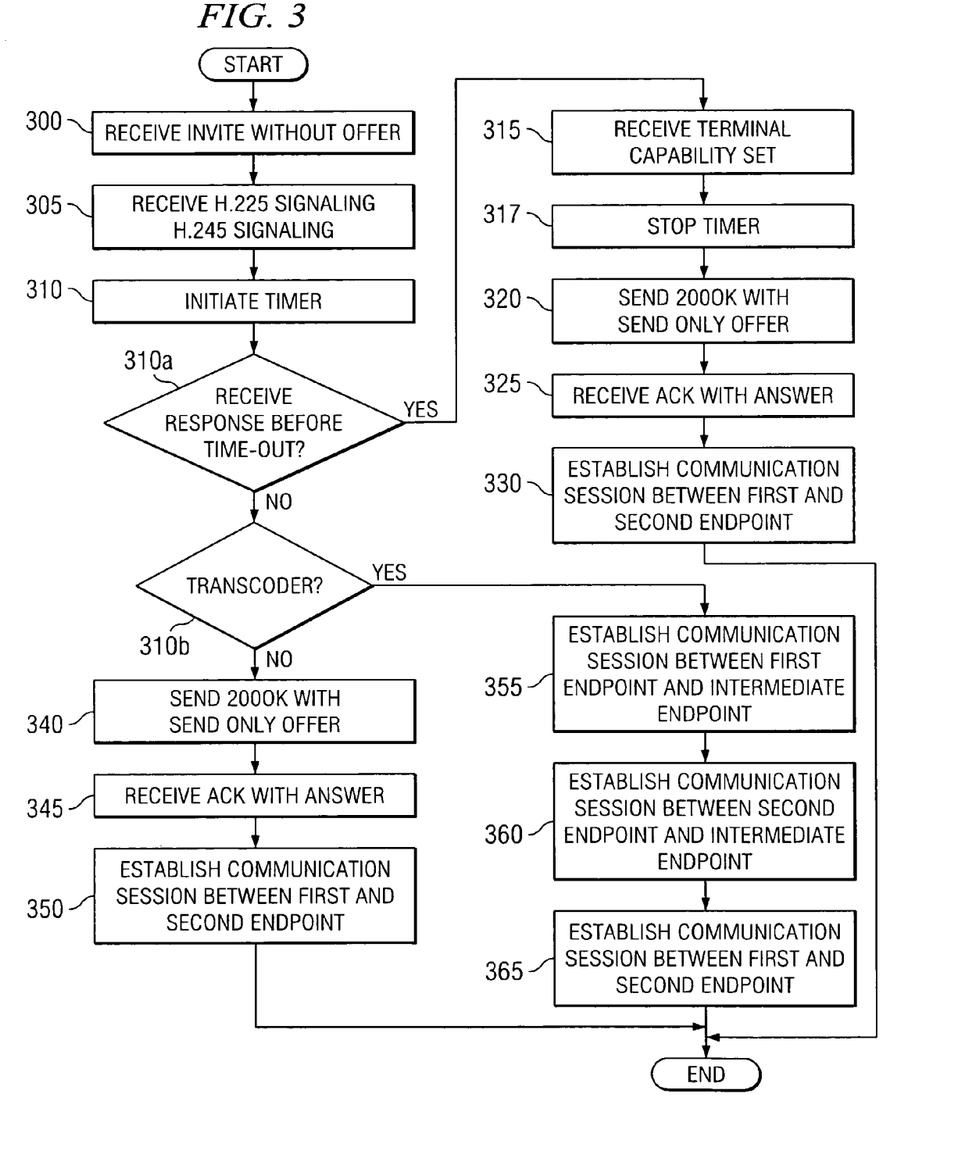
FIG. 3 is a simplified flowchart that illustrates an example method for providing communication protocol interoperability in accordance with an embodiment of the present invention.

FIG. 3 is a flowchart illustrating a method for providing communication protocol interoperability in accordance with an embodiment of the present invention. In this particular flowchart, a SIP endpoint will be trying to establish a communication session with an H.323 endpoint. The method begins at step 300 where an invite without offer is received. The invite without offer may be a SIP request to establish a communication session in which the request does not include the capabilities of the requesting endpoint. Thus, the SIP endpoint may be waiting for the H.323 endpoint to send its capabilities.

At step 305 H.225 and then H.245 signaling from the H.323 endpoint is received. This signaling may not contain the capabilities of the H.323 endpoint but rather is signaling information used in establishing a channel.

At step 310 a timer is initiated. The timer is set to allow a reasonable time for the H.323 endpoint to send its capabilities, for example, through a terminal capabilities set (TCS). If the capabilities of the H.323 endpoint are received, at step 315, before the timer times-out then at step 317 the timer is stopped. The capabilities received from the H.323 endpoint may be relayed to the SIP endpoint through a 200OK with a send only offer at step 320. Along with the H.323 endpoint's capabilities the response may also include temporary information, such as a temporary port and/or IP address, as well as setting the mode of the SIP endpoint to prevent it from sending communications. The offer may contain the H.323 endpoint's capabilities and, to prevent the SIP endpoint from sending communications, it may tell the SIP endpoint that the H.323 endpoint can only send communications. In some embodiments, the SIP endpoint may also be set as inactive.

At step 325, once the SIP endpoint receives the 200OK with send only offer, it may respond by sending an ACK with answer that contains its own capabilities. Once the capabilities of the SIP endpoint have been received, the capabilities of both endpoints will be known and a communication session between the two endpoints may be established using a capability common to both endpoints.

For example, an IG may use the following steps in establishing a communication session between the SIP endpoint and the H.323 endpoint. First, the IG may send the SIP endpoint's media capabilities to the H.323 endpoint. Then the IG and the H.323 endpoint may complete a bidirection acknowledgement of receipt of the SIP endpoints media capabilities. Then a master-slave determination and receipt of a master-slave status acknowledgement may be performed. Next media channel establishment signaling may begin between the H.323 endpoint and the IG. The signaling containing a media channel from the H.323 endpoint may be received next. Then if the H.323 endpoint's receive direction is not disabled then the IG may send the H.323 endpoint's two-way media channel info to the SIP endpoint. Then the IG may receive the SIP endpoint's two-way media channel information and send it to the H.323 endpoint at which point the two endpoints may be connected and may begin to communicate media between each other.

If the timer expires before receiving the H.323 endpoint's capabilities, one of two things may happen depending on the embodiment. In some embodiments, at steps 355 and 360, two independent communication sessions may be established between each endpoint and an intermediate endpoint, such as IG 50 of FIG. 2. Both communication sessions will be created as though the intermediate endpoint was a separate endpoint. Thus, the SIP endpoint and the intermediate endpoint attempt to establish a communication session as though it was a SIP endpoint to SIP endpoint communication session, and similarly the H.323 endpoint and the intermediate endpoint attempt to establish a communication session as though it was an H.323 endpoint to H.323 endpoint communication session. The establishment of the communication sessions with the intermediate endpoint may occur according to standard H.323 or SIP protocol procedures, respectively.

Once the two independent communication sessions have been established, the two sessions are linked such that from the endpoints' perspective it is as though the two endpoints were connected to each other. This is true even where the two endpoints are not using a common capability, for example the SIP endpoint may be using G.711 and the H.323 endpoint may be using G.729. This is because the intermediate endpoint may use a transcoder that allows it to transcode the communications between the two endpoints. It should be noted that the capabilities of the transcoder may be used in determining the capability used in establishing the two independent communication sessions.

If the intermediate endpoint does not include a transcoder or if, for whatever reason, the transcoder is not used then the intermediate endpoint may be pre-configured with a set of capabilities. This may be the case where the capabilities of all the endpoints on one side of the intermediate endpoint are known or where it is presumed that an endpoint includes a common capability. The capabilities the IG is configured with may be relayed to the SIP endpoint through a 200OK with send only offer at step 340. Along with the preconfigured capabilities the response may also include temporary information, such as a temporary port and/or IP address, as well as setting the mode of the SIP endpoint to prevent it from sending communications.

At step 345, once the SIP endpoint receives the 200OK with send only offer, it may respond by sending an ACK with answer that contains its own capabilities. Once the capabilities of the SIP endpoint have been received, they may be passed to the H.323 endpoint. In some embodiments, when the send 200OK with send only offer is sent to the SIP endpoint, a TCS may be sent to the H.323 endpoint. The TCS sent to the H.323 endpoint may contain the same capabilities as were sent to the SIP endpoint. This may cause the H.323 endpoint to send its capabilities in its own TCS. Once both endpoints have provided their capabilities, or accepted the capabilities presented to them from the IG a communication session may be established between the two endpoints.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and IG 50, these elements may be combined, rearranged or positioned in order to accommodate particular routing architectures or needs. In addition, any of these elements may be provided as separate external components to communication system 30, IG 50 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing communication protocol interoperability, comprising:
receiving a request from a first endpoint to establish a communication session with a second endpoint, wherein the request uses a first communication protocol;
receiving a first response from the second endpoint, wherein the first response uses a second communication protocol different than the first communication protocol;
initiating a timer for receiving a set of capabilities from the second endpoint;
sending a third response to the first endpoint, the third response comprising temporary setup information for the first endpoint that prevents the first endpoint from sending a communication until the communication session between the first endpoint and the second endpoint is established; and
establishing the communication session between the first endpoint and the second endpoint.

2. The method of claim 1, further comprising:
stopping the timer upon receiving a second response from the second endpoint, wherein the second response comprises a first set of capabilities of the second endpoint.

3. The method of claim 2, further comprising:
receiving a fourth response from the first endpoint comprising a second set of capabilities of the first endpoint, and wherein the communication session between the first endpoint and the second endpoint is established using at least one capability that is common to both the first set of capabilities associated with the second endpoint and the second set of capabilities associated with the first endpoint.

4. The method of claim 1, further comprising:
stopping the timer after a first amount of time, during which time no response is received from the second endpoint.

5. The method of claim 4, wherein establishing the communication session between the first endpoint and the second endpoint comprises:
establishing a first communication session between the first endpoint and an intermediate endpoint based on a first capability common to the first endpoint and the intermediate endpoint;
establishing a second communication session between the second endpoint and the intermediate endpoint based on a second capability common to the first endpoint and the intermediate endpoint; and
coupling the first communication session with the second communication session via a transcoder.

6. The method of claim 4, further comprising:
sending a fifth response to the first endpoint, the fifth response comprises a third set of pre-configured capabilities and temporary setup information for the first endpoint that prevents the first endpoint from sending a communication until the communication session between the first endpoint and the second endpoint is established; and
receiving a sixth response from the first endpoint comprising a second set of capabilities of the first endpoint, and wherein the communication session between the first endpoint and the second endpoint is established using at least one capability that is common to both the second set of capabilities associated with the first endpoint and the third set of pre-configured capabilities.

7. A system for providing communication protocol interoperability, comprising:
an interface operable to:
receive a request from a first endpoint to establish a communication session with a second endpoint, wherein the request uses a first communication protocol; and
receive a first response from the second endpoint, wherein the first response uses a second communication protocol different than the first communication protocol; and
a processor coupled to the interface and operable to:
initiate a timer for receiving a set of capabilities from the second endpoint;
send a third response to the first endpoint, the third response comprising temporary setup information for the first endpoint that prevents the first endpoint from sending a communication until the communication session between the first endpoint and the second endpoint is established; and
establish the communication session between the first endpoint and the second endpoint.

8. The system of claim 7, wherein the processor is further operable to stop the timer upon the interface receiving a second response from the second endpoint, and wherein the second response comprises a first set of capabilities of the second endpoint.

9. The system of claim 8, wherein:
the interface is further operable to receive a fourth response from the first endpoint comprising a second set of capabilities of the first endpoint, and wherein the communication session between the first endpoint and the second endpoint is established using at least one capability that is common to both the first set of capabilities associated with the second endpoint and the second set of capabilities associated with the first endpoint.

10. The system of claim 7, wherein the processor is further operable to stop the timer after a first amount of time, during which time no response is received from the second endpoint.

11. The system of claim 10, wherein the processor operable to establish the communication session between the first endpoint and the second endpoint comprises a processor operable to:
establish a first communication session between the first endpoint and an intermediate endpoint based on a first capability common to the first endpoint and the intermediate endpoint;
establish a second communication session between the second endpoint and the intermediate endpoint based on a second capability common to the first endpoint and the intermediate endpoint; and
couple the first communication session with the second communication session via a transcoder.

12. The system of claim 10, wherein:
the processor is further operable to send a fifth response to the first endpoint, the fifth response comprises a third set of pre-configured capabilities and temporary setup information for the first endpoint that prevents the first endpoint from sending a communication until the communication session between the first endpoint and the second endpoint is established; and
the interface is further operable to receive a sixth response from the first endpoint comprising a second set of capabilities of the first endpoint, and wherein the communication session between the first endpoint and the second endpoint is established using at least one capability that is common to both the second set of capabilities associated with the first endpoint and the third set of pre-configured.

13. The system of claim 7 wherein the first communication protocol and the second communication protocol are selected from the group consisting of session initiation protocol (SIP) and H.323.

14. Computer readable medium encoded with a computer program such that when executed is operable to:
receive a request from a first endpoint to establish a communication session with a second endpoint, wherein the request uses a first communication protocol;
receive a first response from the second endpoint, wherein the first response uses a second communication protocol different than the first communication protocol;
initiate a timer for receiving a set of capabilities from the second endpoint;
send a third response to the first endpoint, the third response comprising temporary setup information for the first endpoint that prevents the first endpoint from sending a communication until the communication session between the first endpoint and the second endpoint is established; and
establish the communication session between the first endpoint and the second endpoint.

15. The medium of claim 14, wherein the code is further operable to stop the timer upon receiving a second response from the second endpoint, wherein the second response comprises a first set of capabilities of the second endpoint.

16. The medium of claim 15, further comprising code operable to:
receive a fourth response from the first endpoint comprising a second set of capabilities of the first endpoint, and wherein the communication session between the first endpoint and the second endpoint is established using at least one capability that is common to both the first set of capabilities associated with the second endpoint and the second set of capabilities associated with the first endpoint.

17. The medium of claim 14, wherein the code is further operable to stop the timer after a first amount of time, during which time no response is received from the second endpoint.

18. The medium of claim 17, wherein the code operable to establish the communication session between the first endpoint and the second endpoint comprises code operable to:
establish a first communication session between the first endpoint and an intermediate endpoint based on a first capability common to the first endpoint and the intermediate endpoint;
establish a second communication session between the second endpoint and the intermediate endpoint based on a second capability common to the first endpoint and the intermediate endpoint; and
couple the first communication session with the second communication session via a transcoder.

19. The medium of claim 17, further comprising code operable to:
send a fifth response to the first endpoint, the fifth response comprises a third set of pre-configured capabilities and temporary setup information for the first endpoint that prevents the first endpoint from sending a communication until the communication session between the first endpoint and the second endpoint is established; and
receive a sixth response from the first endpoint comprising a second set of capabilities of the first endpoint, and wherein the communication session between the first endpoint and the second endpoint is established using at least one capability that is common to both the second set of capabilities associated with the first endpoint and the third set of pre-configured capabilities.

20. A system for providing communication protocol interoperability, comprising:

means for receiving a request from a first endpoint to establish a communication session with a second endpoint, wherein the request uses a first communication protocol;

means for receiving a first response from the second endpoint, wherein the first response uses a second communication protocol different than the first communication protocol;

means for initiating a timer for receiving a set of capabilities from the second endpoint;

means for sending a third response to the first endpoint, the third response comprising temporary setup information for the first endpoint that prevents the first endpoint from sending a communication until the communication session between the first endpoint and the second endpoint is established; and means for establishing the communication session between the first endpoint and the second endpoint.

* * * * *